United States Patent [19]

Yamada et al.

[11] 4,404,618
[45] Sep. 13, 1983

[54] FLASH DEVICE

[75] Inventors: Tateo Yamada, Yokohama; Toshiharu Mamiya, Kawasaki; Kazuo Ikawa, Yokohama, all of Japan

[73] Assignee: Canon Kabushiki Kaisha, Tokyo, Japan

[21] Appl. No.: 299,183

[22] Filed: Sep. 3, 1981

[30] Foreign Application Priority Data

Sep. 12, 1980 [JP] Japan ............................... 55-126865
Dec. 23, 1980 [JP] Japan ............................... 55-183136
Dec. 23, 1980 [JP] Japan ............................... 55-186510

[51] Int. Cl.³ .......................... F21K 5/02; G03B 15/02
[52] U.S. Cl. ..................................... 362/17; 313/111; 362/18; 431/365
[58] Field of Search .................... 362/17, 18; 313/111; 431/365

[56] References Cited

U.S. PATENT DOCUMENTS

| | | | |
|---|---|---|---|
| 3,127,112 | 3/1964 | McCammon et al. | 362/17 |
| 3,484,597 | 12/1969 | Schmidt | 362/16 |
| 4,136,378 | 1/1979 | Chevali | 362/17 |
| 4,223,372 | 9/1980 | Takematsu | 362/15 |

*Primary Examiner*—Irwin Gluck
*Attorney, Agent, or Firm*—Toren, McGeady and Stanger

[57] ABSTRACT

A flash device of the type in which the flash tube is coated with a trigger electrode and is positioned in contact with the back metal constituting part of the reflector so that when the trigger signal is applied directly to the back metal, the flash tube is triggered. In this type of flash device the back metal constituting part of the reflector is configured to a round shape. Because of the necessity of insuring good light distribution it is generally made of bright alloy aluminum. This not only makes it difficult to finely adjust the position of the flash tube relative to the back metal and electrically connect the trigger wire lead with the back metal, but also gives rise to a problem of electrically insulating the back metal from the other metallic parts since a very high voltage for triggering is applied to the back metal. The present invention provides a flash device which has solved the various problems by providing the back metal with embossed portions to adjust the position of the flash tube, by pressure-setting the connection of the trigger wire lead with the back metal, and by applying an electrically insulating coating on the back surface of the back metal.

9 Claims, 2 Drawing Figures

FLASH DEVICE

BACKGROUND OF THE INVENTION

1. Field of the Invention

This invention relates to flash devices, and more particularly to flash devices of the type in which the neso-coat for triggering applied on the outer surface of the flash tube is connected to the back metal, forming part of the reflector, and upon application of the trigger signal to the back metal, the flash tube is fired.

2. Description of the Prior Art

In the past, the method of triggering the flash tube in the flash device was to provide the transparent electrode portion of the flash tube with a trigger band to which the trigger voltage is applied. However, the use of this method in view of the efficient production of reflected light necessitates the trigger band be outside the effective part of the reflector. Therefore, the length of the flash tube must be longer than that of the effective part of the reflector, thereby the housing for accommodating the flash tube of the flash device is increased in bulk and size.

The application of such a flash device to so-called stroboscopic built-in cameras, because of the relatively large volume of the light source housing of the flash device, was not advantageous because the camera itself increased in size. Thus, the camera was very inconvenient for the user to carry.

To eliminate these drawbacks, in recent years a new triggering method has been proposed in which without the use of the trigger band, the back metal forming part of the reflector directly applies the trigger signal to the flash tube. By using this method it is possible to reduce the size of the flash tube accommodating housing.

According to this method, the direct application of the trigger signal from the back metal to the flash tube requires that a good electrical connection be established between the back metal and the neso-coat for triggering, applied as a transparent electrode on the outer wall of the flash tube. For this purpose, the flash tube must be pressed against the back metal by a sufficient force. Since the back metal also functions as a reflector it is configured to a circular or parabolic shape. It is difficult to put the flash tube, of which the cross-section is a small circle compared with the back metal, into a prescribed position with high accuracy even when the flash tube rests with stability on the back metal under pressure. This leads to the impossibility of assuring good light distribution and accuracy of each guide number.

In the conventional adjusting method, mention may be made of U.S. Pat. Nos. 3,484,597; 3,127,112 and 4,223,372. In U.S. Pat. No. 3,484,597, the back metal itself is shaped in conformity with the roundness of the flash tube, thus enabling automatic position adjustment of the flash tube. In U.S. Pat. No. 3,127,112, the side walls of the reflector are provided with respective holes upon insertion of the flash tube therein to effect position adjustment of the flash tube. In U.S. Pat. No. 4,223,372, the flash tube is merely positioned in contact with the back metal. Accordingly, the method of U.S. Pat. No. 3,484,597 has a disadvantage that the shape of the back metal cannot be freely designed to suit its action to a reflector, as the circular form of the back metal is necessarily coincident with that of the flash tube. Therefore the light distribution cannot be freely prescribed. Also U.S. Pat. No. 3,127,112 has a similar disadvantage to that of the above-cited patent in that the back metal cannot be constructed in a freely prescribed form. A disadvantage of U.S. Pat. No. 4,223,372 is that the fine adjustment of the flash tube position becomes difficult to perform.

Another requirement of the new triggering method is that because of the direct application of the trigger signal from the back metal to the flash tube, the lead wire for triggering signal transmission is connected to the back metal body itself. However, the back metal is generally made of bright alloy aluminium in view of the impartment of the light reflecting function which sufficiently assures the light distribution characteristics and guide number characteristics of the flash light emitting device. Since, in general, the soldering of an aluminium plate is a very difficult operation, the connection of the triggering lead wire to the back metal is difficult.

In addition to the above-described problems, because the high voltage trigger signal is applied to the back metal, it is essential to establish sufficient electrical insulation of the back metal from the other metallic parts of the flash device. When the flash device using this triggering method is incorporated in a camera with a guide rail for the flash device to pop up for compactness, as the guide rail is positioned near the back metal, sufficient insulation between the guide rail and the back metal must be insured. Otherwise the triggering could not be carried out, and the user would suffer an accident such as electric shock.

SUMMARY OF THE INVENTION

With the foregoing in mind, it is an object of the present invention to provide a flash device which makes it possible to assemble the flash tube in a prescribed highly accurate position relative to the reflector in the form of the back metal by providing the back metal with embossed portions to adjust the position of the flash tube. Thereby assuring good light distribution and accuracy of guide numbers.

Another form of the invention includes a flash device having a back metal and a portion with a pressure-adhesive terminal means to connect a triggering lead wire in compressed relation, thus enabling the triggering lead wire to be connected with ease to the back metal.

Another form of the invention has a flash device in which the flash tube is triggered by applying a triggering signal to a back metal, whereby the back metal is provided with an electrically insulating coating (for example, in the form of a polyester film adhesive tape) on the back surface thereof to solve the problem of the back metal insulation.

These and other objects and features of the present invention will become apparent from the following detailed description of an embodiment thereof taken in conjunction with the accompanying drawings:

DESCRIPTION OF THE PREFERRED EMBODIMENT

Figure 1:
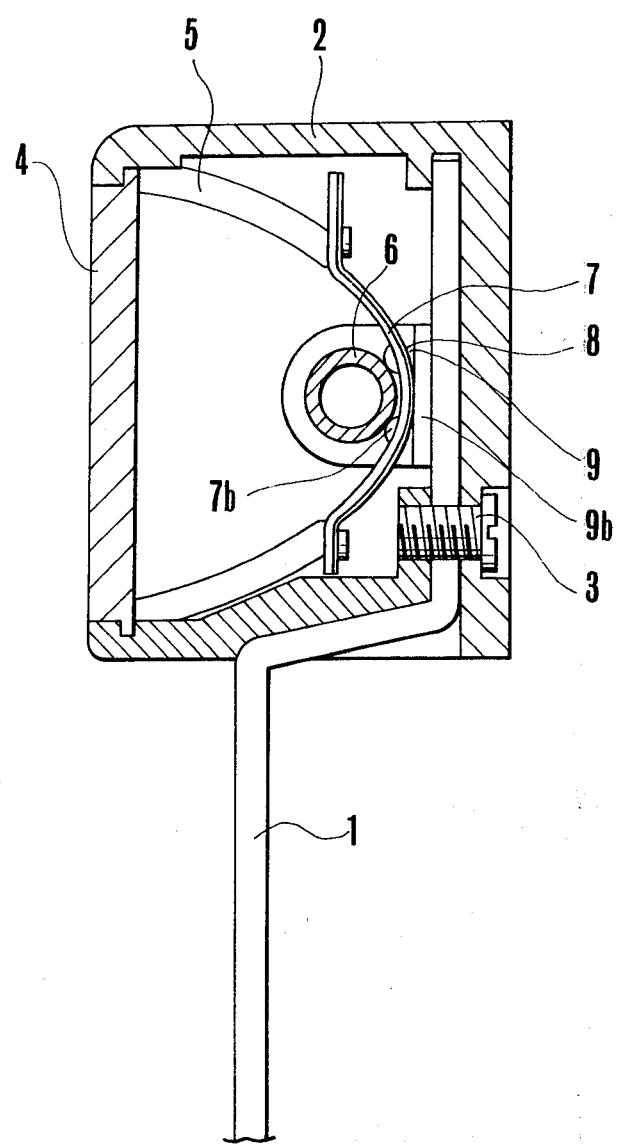
FIG. 1 is a sectional view of one embodiment of a flash device according to the present invention.
Figure 2:
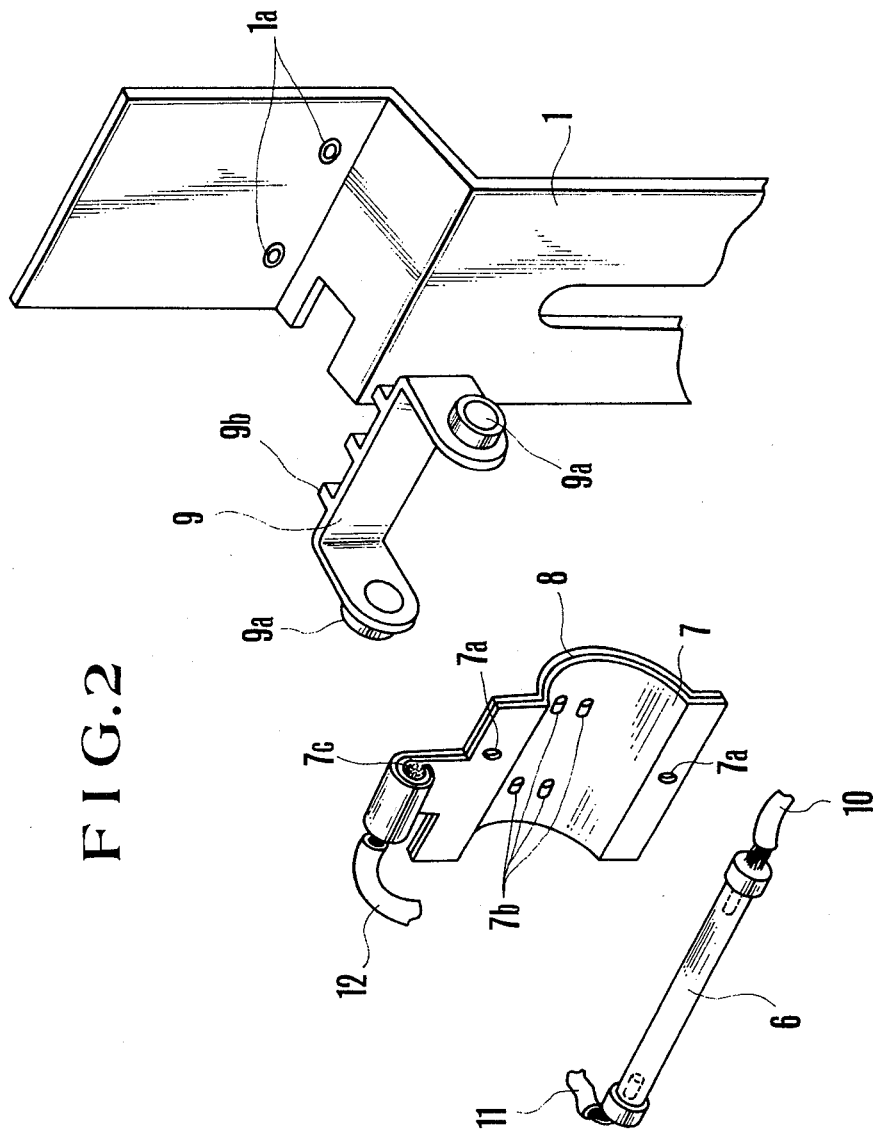
FIG. 2 is a fragmentary exploded perspective view of the flash device of FIG. 1.

The flash device, according to the present invention, is described on the basis of an embodiment illustrated in FIGS. 1 and 2.

In FIGS. 1 and 2, a slide rail 1 is provided for moving the device up and down relative to a camera housing (not shown); a housing 2 accommodates a flash tube 6 and the like, the housing 2 is mounted on the slide rail 1 in fixedly secured relation by screw fasteners 3 engaging in screw-threaded holes 1a. At the front of the housing 2 there is fixed a Fresnel lens 4 to project flash light from the flash tube onto an object being photographed. A reflection shade 5 has an inner surface on which an aluminium layer is deposited, and fixedly secured to a back metal 7 by screw fasteners engaging in screw-threaded holes 7a provided in the wall of the back metal 7. The back metal 7 is manufactured of a bright alloy, and forms a reflection mirror together with the reflection shade 5.

Embossed portions 7b are provided in the back metal 7. When the flash tube 6 is brought into abutting engagement with the embossed portions 7b and then allowed to rest in stability under a pressure, the position of the flash tube 6 relative to the reflector is automatically adjusted, and an electrical connection of a triggering transparent electrode (triggering neso-coat) is established on the outer surface of the flash tube 6 with the back metal 7.

An end portion 7c of the back metal 7 is configured to a cylindrical shape constituting a pressure-adhesive connector portion. After a triggering wire lead 12 is inserted into a hollow core of the end portion 7c, the end portion 7c is tightened to fix the connection of the lead 12 with the back metal 7.

An electrically insulating coating 8 is in intimate contact on the back surface of the back metal 7. The process for producing the coating includes the steps of laminating an electrically insulating tape (for example, polyester film adhesive tape) on a bright alloy aluminium plate as a starting material of the back metal and then stamping the laminated plate to the form of the back metal. The coating prevents an electrical contact of the back metal with the rail 1 and insures that the very high voltage at the back metal is electrically insulated from the other metallic constituents.

A rubber bushing 9 is manufactured of electrical insulating material. The two sides of the rubber bushing are each provided with a projected portion 9a into which either end of the flash tube 6 is inserted.

The flash tube 6 is held by the projected portions 9a and is pressed inwards by the elastic property of the rubber bushing 9 so that, as has been mentioned above, the position of the flash tube 6 is determined by the embossed portions 7b of the back metal, and a good electrical connection between the triggering electrode and the back metal is assured.

On the back surface of the rubber bushing 9 are provided three resilient lugs 9b upon compression to urge the reflector of the back metal and reflection shade toward the Fresnel lens 5, thus determining the position of the reflector. Wires 10 and 11 are leads for main electrodes of the flash tube.

With such a configuration, the flash tube 6 can be set on the back metal in an accurate position, and the triggering neso-coat of the flash tube is simultaneously connected to the back metal. Upon application of a high voltage to the back metal, the flash tube is fired and thus emits flash light.

In the flash light emitting device, according to the present invention, the back metal serves as a position adjusting means for the flash tube, and as the position of the flash tube can be finely adjusted relative to the reflector in the form of the back metal, the flash light produces good light distribution and results in precise guide number ratings.

Another feature of the flash device, according to the present invention, is that the back metal also serves as an electrical interconnector but is electrically insulated from the other metallic members of the flash device by a very simple coating means. Therefore, the use of the triggering method which is applied directly to the back metal is a great advantage.

Still another feature of the flash device, according to the present invention, is that a portion of the back metal clamps the connection of the triggering wire lead therewith. Therefore, even when a bright alloy is selected as the material of the back metal, it is possible to connect the triggering lead wire to that back metal quickly and with ease.

What is claimed is:

1. A flash light emitting device including:
 a flash tube, said flash tube being coated with a trigger electrode;
 a back metal which serves as at least a portion of a reflection mirror and an electric current path for a triggering signal applied to said back metal, said back metal being provided with embossed portions; and
 means for pressing said flash tube against said embossed portions so that the contact of the flash tube with the back metal and the adjustment in position of said flash tube relative to the back metal are effected.

2. A flash light emitting device according to claim 1, where said trigger electrode is a trigger neso-coat applied on the outer wall of said flash tube.

3. A flash light emitting device including:
 a flash tube, said flash tube being coated with a trigger electrode;
 a back metal acting as at least a portion of a reflection mirror, said back metal having a front surface with which said flash tube contacts so that when a triggering signal is applied to said back metal, said flash tube is triggered; and
 an electrically insulating coating applied on the rear surface of said back metal, whereby the electrical insulation of the metallic members of the flash device against said back metal is made by said coating.

4. A flash light emitting device according to claim 3, where said coating is formed by laminating an insulating tape on a metal sheet, and then stamping the sheet to the form of said back metal.

5. A flash light emitting device according to claim 3, where said trigger electrode is a trigger neso-coat applied on the outer wall of said flash tube.

6. A flash device including:
 a flash tube, said flash tube being coated with a trigger electrode;
 an electrically conductive trigger member for supplying a triggering signal; and
 a back metal acting as at least a portion of a reflection mirror, said back metal being in contact with said flash tube so that when the triggering signal is applied to said back metal, said flash tube is triggered, a portion of said back metal being provided with a pressure-adhesive connecting means to clamp the connection of said conductive member therewith.

7. A flash device according to claim 6, where said pressure-adhesive connection portion is formed by tightly wrapping said conductive member by said portion of said back metal.

8. A flash device according to claim 7, where said pressure-adhesive connecting portion is formed by shaping one end of said back metal to a hollow cylinder.

9. A flash device according to claim 6, where said trigger electrode is a trigger neso-coat applied on the outer wall of said flash tube.

* * * * *